United States Patent

Alrabady

(10) Patent No.: US 7,805,612 B2
(45) Date of Patent: Sep. 28, 2010

(54) USE OF GLOBAL CLOCK TO SECURE AND SYNCHRONIZE MESSAGES IN XM AND SMS MESSAGES TO A VEHICLE

(75) Inventor: Ansaf I. Alrabady, Livonia, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1329 days.

(21) Appl. No.: 11/293,718

(22) Filed: Dec. 2, 2005

(65) Prior Publication Data
US 2007/0130469 A1 Jun. 7, 2007

(51) Int. Cl.
*H04L 9/32* (2006.01)
(52) U.S. Cl. .......................... 713/178; 380/247
(58) Field of Classification Search .................. 713/178
See application file for complete search history.

(56) References Cited

U.S. PATENT DOCUMENTS

| | | | | |
|---|---|---|---|---|
| 5,432,841 A * | 7/1995 | Rimer | | 455/457 |
| 5,617,317 A * | 4/1997 | Ignagni | | 701/215 |
| 6,211,907 B1 * | 4/2001 | Scaman et al. | | 348/148 |
| 6,411,887 B1 * | 6/2002 | Martens et al. | | 701/115 |
| 6,853,910 B1 * | 2/2005 | Oesterling et al. | | 701/207 |
| 2002/0163418 A1 * | 11/2002 | Nemoto | | 340/5.2 |
| 2003/0095688 A1 * | 5/2003 | Kirmuss | | 382/105 |
| 2003/0103482 A1 * | 6/2003 | Van Bosch | | 370/338 |
| 2005/0165886 A1 * | 7/2005 | Tuer et al. | | 709/203 |
| 2005/0210306 A1 * | 9/2005 | Rich et al. | | 713/400 |

* cited by examiner

*Primary Examiner*—Christian LaForgia
*Assistant Examiner*—Dant B Shaifer Harriman
(74) *Attorney, Agent, or Firm*—John A. Miller; Miller IP Group, PLC

(57) ABSTRACT

A system and method for providing secure one-way transmissions in a vehicle wireless communications system. The system and method rely on a clock signal to assure that the vehicle and server receive proper messages. The vehicle and the server will periodically synchronize their internal clocks to a global clock signal. The server will add its local time to the body of a message including a vehicle identification number and a function code. The server will then encrypt the message and transmit it to the vehicle. The vehicle will decrypt the message and compare the transmitted vehicle identification number with its identification number. If the identification numbers match, the vehicle will then see if the time in the message is within a predefined window of the vehicle time. If the transmitted time is within the predefined window of the vehicle time, the vehicle will accept the message and perform the function.

20 Claims, 2 Drawing Sheets

USE OF GLOBAL CLOCK TO SECURE AND SYNCHRONIZE MESSAGES IN XM AND SMS MESSAGES TO A VEHICLE

BACKGROUND OF THE INVENTION

1. Field of the Invention

This invention relates generally to a system and method for providing security for one-way message transmissions and, more particularly, to a system and method for providing security for short message system messages, where the system and method use a synchronized clock signal that is added to the message.

2. Discussion of the Related Art

Communications systems are known in the art that allow a central service center to communicate wirelessly with a vehicle to provide various services, such as unlocking the vehicle, updating the software in the various ECUs within the vehicle, etc. The central service center will include a server that allows it to wirelessly communicate with the vehicle over the designated frequencies through one or more of cellular based communications, land-lines, satellite communications and the internet.

These types of wireless communications systems sometimes employ short message system (SMS) communications links where the messages are transmitted on a one-way channel with no return transmissions. In other words, there is no verification that the message is received. These types of SMS communications links are desirable because they reduce the amount of bandwidth and power required to provide the communications link. For example, in the vehicle communications system discussed above, a vehicle operator may call the service center to ask that the vehicle doors be unlocked. The service center may wireless communicate the command to unlock the door using an SMS message at low bandwidth and low cost.

A potential security threat exists with this type of SMS communications link. Particularly, it is possible for a hacker to receive and record the transmitted message from the service center to the vehicle and/or prevent the message from the service center from reaching the vehicle. The hacker can then replay the message at a later time to perform a particular function. For example, if an SMS message is sent to unlock the vehicle doors, the hacker can block the message at the router level or in the air by jamming the signal. Because the captured message is a valid message, the hacker can replay the message at a later time when the vehicle owner is not close to the vehicle and gain unauthorized access to the vehicle.

SUMMARY OF THE INVENTION

In accordance with the teachings of the present invention, a system and method are disclosed for providing secure one-way transmissions in a vehicle wireless communications system. The system and method rely on a clock signal to assure that the vehicle and server receive proper messages. The vehicle and the server will periodically synchronize their internal clocks with a global clock based on a certain algorithm. When the server wishes to transmit a message wirelessly to the vehicle, it will include its local clock signal in the body of the message with a vehicle identification number and a particular function code. The server will then encrypt the message and transmit it to the vehicle. The vehicle will decrypt the message and compare the transmitted vehicle identification number with its identification number. If the identification numbers match, the vehicle will then see if the time in the message is within a predefined window of the vehicles local clock time. If the transmitted time is within the predefined window of the vehicles time, the vehicle will accept the message and perform the function. Otherwise, the vehicle will reject the message as being an invalid or possibly replayed message. The time can also be used to validate a message transmitted from the vehicle to the server in the same manner.

Additional features of the present invention will become apparent from the following description and appended claims taken in conjunction with the accompanying drawings.

DETAILED DESCRIPTION OF THE EMBODIMENTS

The following discussion of the embodiments of the invention directed to a system and method for providing security for a short message system in a wireless vehicle communications system is merely exemplary in nature, and is in no way intended to limit the invention or its applications or uses.

Figure 1:
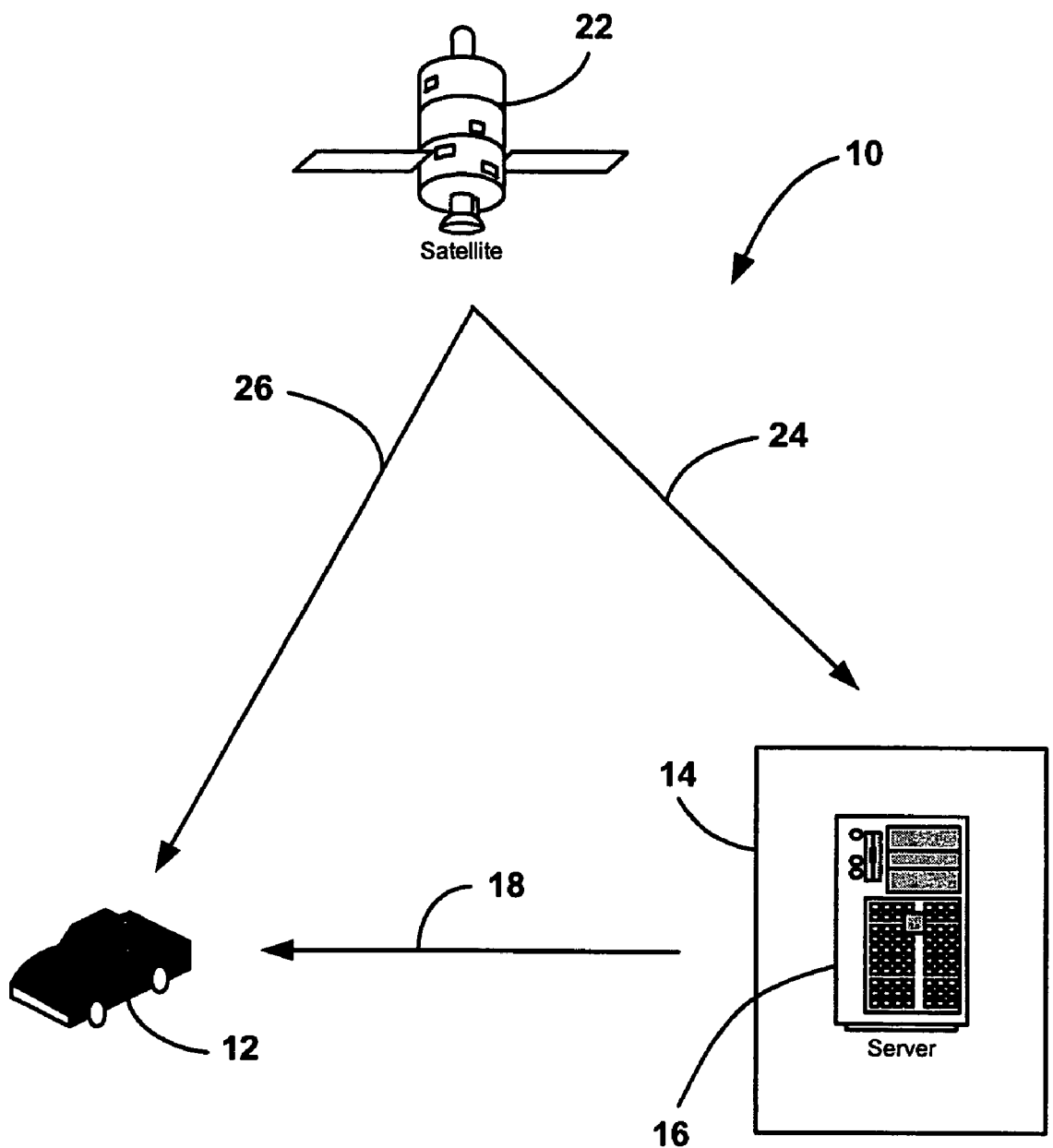
FIG. 1 is an exemplary diagram of a vehicle and a service center using a one-way channel communications link, according to an embodiment of the invention.

FIG. 1 is a diagram of a system 10 providing wireless communications between a vehicle 12 and a service center 14 including a server 16. The system 10 shows a one-way SMS message 18 transmitted by the server 16 to the vehicle 12. The message 18 is intended to be transmitted wirelessly by any suitable manner, including cellular communications links, satellite communications links, internet links, etc., as would be well understood to those skilled in the art. The vehicle 12 can also transmit an SMS message to the server 16. The discussion herein of the vehicle 12 receiving transmitted messages from the server 16 is intended to represent any known communications system of this type, such as XM™ radio, Sirius™ radio, On-Star™, etc. The specific architecture and design of the communications system is not necessary for a proper understanding of the invention.

As will be discussed in detail below, the vehicle 12 and the server 16 receive signals 24 and 26, respectively, from a satellite 22 that include a clock signal of the current time. The vehicle 12 and the server 16 will periodically capture the signals 24 and 26 to update their internal clocks to be synchronized to each other. Any suitable algorithm can be used to determine the time when the vehicle 12 and the server 16 synchronize their internal clock to the global clock so that a potential hacker will not be able to determine that time. In one embodiment, the signals 24 and 26 are GPS signals, but can be any other signal that includes the time that can be received by both the vehicle 12 and the server 16, such as an atomic clock signal.

Figure 2:
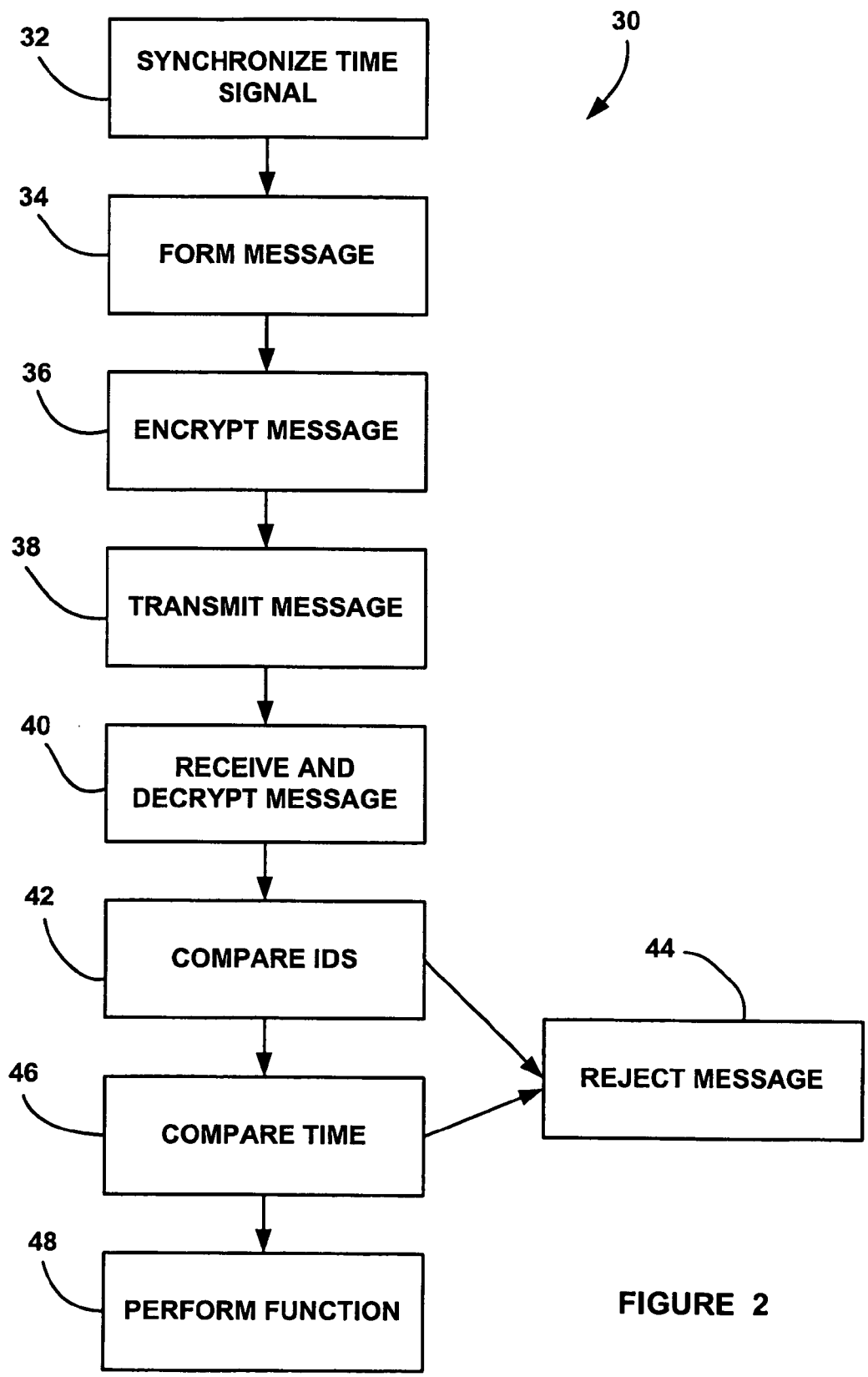
FIG. 2 is a flow chart diagram showing an exemplary operation for providing security for one-way channel messages between a vehicle and a service center, according to an embodiment of the invention.

FIG. 2 is a flow chart diagram 30 showing a method, according to an embodiment of the present invention, for providing security for the SMS message 18 to prevent a hacker from recording the message 18 being transmitted to the vehicle 12, and later replaying the message 18 to cause the replayed message to perform the particular vehicle function, such as unlocking the vehicle doors. The vehicle 12 and the server 16 will periodically capture the signals 24 and 26 to update their internal clocks and be synchronized to each other at box 32 according to any suitable algorithm. Because the potential hacker will not know the synchronization time, he will not be able to fraudulently cause the vehicle 12 to update its internal clock.

When the server 16 wishes to send the message 18 to the vehicle 12, it will form a message at box 34 that includes its local time previously synchronized from the signal 26. The server 16 will form the message by adding the local time to a message block including the desired vehicle identification number and the code for the particular function to be performed, such as unlocking the vehicle doors. The server 16 will then encrypt the combined message at box 36 by any suitable encryption process, which would be well known to those skilled in the art. The server 16 will then transmit the message 18 to the vehicle 12 at box 38.

The vehicle 12 will receive and decrypt the message 18 at box 40. The vehicle 12 will then compare its vehicle identification number to the transmitted identification number in the message 18 at box 42. If the two identification numbers do not match, then the vehicle 12 does not perform the requested function at box 44. If the two identification numbers do match, the vehicle 12 will then compare the current time of the vehicles local clock that has been previously synchronized to the signal 24 with the time encoded in the received message at box 46. If the two times are within a predefined time window, the vehicle 12 accepts the message 18 and performs the function in the message 18 at box 48. If the two times are not within the predefined window, the vehicle 12 rejects the message 18 at the box 44.

The predefined window would be application specific for the particular system. The vehicle 12 may only be powered on to receive messages periodically, so that if it receives the message 18 during an off period, the predefined window must compensate for this discrepancy in time. Further, it will take some time for the server 16 to go through the process of encrypting and transmitting the message, and there will be some time delay from when the message is transmitted to when it is received and decrypted by the vehicle 12.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing security for a communications signal transmitted from a server to a vehicle, said method comprising:
    periodically receiving a global time signal by the vehicle and the server;
    synchronizing a local time signal in the vehicle and the server to the global time signal;
    adding a server local time signal to a one-way message including a vehicle identification number and a function code in the server;
    encrypting the message in the server;
    transmitting the message from the server to the vehicle;
    receiving the message in the vehicle;
    decrypting the message in the vehicle;
    comparing a vehicle identification number of the vehicle with the vehicle identification number in the message;
    comparing the server local time signal in the message with a vehicle local time signal in the vehicle; and
    performing a function associated with the function code if the vehicle identification numbers match and the server local time signal in the message is within a predefined window of the vehicle local time signal.

2. The method according to claim 1 wherein the global time signal is provided by a GPS signal.

3. The method according to claim 2 wherein the GPS signal is provided by a satellite.

4. The method according to claim 1 wherein the transmitted message is a short message system message.

5. The method according to claim 1 wherein the function is unlocking the vehicle doors.

6. The method according to claim 1 wherein periodically receiving a global time signal by the vehicle and the server includes receiving the global time signal at a predetermined time defined by an algorithm.

7. A method for providing security for a short message communications signal transmitted between a server and a vehicle, said method comprising:
    periodically receiving a global time signal by the vehicle and the server;
    synchronizing a local time signal in the vehicle and the server to the global time signal;
    adding the local time signal to a one-way message including a vehicle identification number and a function code in the server;
    transmitting the message between the server and the vehicle;
    receiving the message by the vehicle or the server;
    comparing the local time signal in the message with the local time signal in the vehicle or the server that received the message; and
    performing a function associated with the function code if the local time signal in the message is within a predefined window of the local time signal in the vehicle or the server.

8. The method according to claim 7 further comprising encrypting the message in the vehicle or the server and decrypting the corresponding message in the server or the vehicle.

9. The method according to claim 7 wherein the global time signal is provided by a GPS signal.

10. The method according to claim 7 wherein periodically receiving a global time signal by the vehicle and the server includes receiving the global time signal at a predetermined time defined by an algorithm.

11. A system for providing security for a communications signal transmitted from a server to a vehicle, said system comprising:
    means for periodically receiving a global time signal by the vehicle and the server;
    means for synchronizing a local time signal in the vehicle and the server to the global time signal;
    means for adding a server local time signal to a one-way message including a vehicle identification number and a function code in the server;
    means for encrypting the message in the server;
    means for transmitting the message from the server to the vehicle;
    means for receiving the message in the vehicle;
    means for decrypting the message in the vehicle;
    means for comparing a vehicle identification number of the vehicle with the vehicle identification number in the message;
    means for comparing the server local time signal in the message with a vehicle local time signal in the vehicle; and
    means for performing a function associated with the function code if the vehicle identification numbers match and the server local time signal in the message is within a predefined window of the vehicle local time signal.

12. The system according to claim 11 wherein the global time signal is provided by a GPS signal.

13. The system according to claim 12 wherein the GPS signal is provided by a satellite.

14. The system according to claim 11 wherein the transmitted message is a short message system message.

15. The system according to claim 12 wherein the vehicle and the server receive the global time signal periodically based on an algorithm.

16. A wireless vehicle communication system comprising:
   a vehicle receiving a global time signal, said vehicle synchronizing a vehicle local time signal to the global time signal; and
   a server receiving the global time signal, said server synchronizing a server local time signal to the global time signal, said server or the vehicle adding the server or vehicle local time signal to a one-way message including a vehicle identification number and a function code, said server or vehicle transmitting the message, said vehicle or server comparing the local time signal in the message with the local time signal in the server or the vehicle that receives the message and said vehicle or server performing a function associated with the function code if the local time signal in the message is within a predefined window of the local time signal in the server or the vehicle.

17. The system according to claim 16 wherein the server or the vehicle encrypts the message and the server or the vehicle decrypts the corresponding message.

18. The system according to claim 16 wherein the global time signal is provided by a GPS signal.

19. The system according to claim 18 wherein the GPS signal is provided by a satellite.

20. The system according to claim 16 wherein the vehicle and the server receive the global time signal periodically as determined by an algorithm.

* * * * *